Patented May 6, 1941

2,241,030

UNITED STATES PATENT OFFICE 2,241,030

TREATMENT OF CURING PICKLE

Walter Richard Hess, Chicago, Ill., assignor to Industrial Patents Corporation, Chicago, Ill., a corporation of Delaware No Drawing. Application December 31, 1938, Serial No. 248,864

9 Claims. (Cl. 99—159)

This invention relates to the treatment of pickling brines employed in treating meat, for example, in curing hams.

In the curing of meat, for example ham, the ham is placed in a pickling brine containing salt, nitrates, nitrites, and sugar for a desired period of time to effect a penetration of the brine into the meat to impart the desired flavor and to tender the meat. In the conventional practice, ham is retained in the brine for from sixty to ninety days. The composition of the brine and the period of treatment of the ham varies with individual packers to produce the desired end product.

A closer control of the curing process and a shortening of the curing period may be obtained by injecting pickling brine at random into the meat before placing it in the vat containing pickling brine.

In United States Patent No. 1,951,436 to Paddock, a method of curing hams is disclosed in which pickling brine is pumped into the circulatory system of the ham before the ham is placed in the vat containing cover pickle.

In United States Patent No. 2,084,864 to Paddock, a method of curing hams is disclosed in which a portion of the pickling brine is pumped into the cushion side of the ham, and a portion of the brine is pumped into the flank side of the ham. The methods disclosed in these two patents allow a more thorough and uniform penetration of the brine into the ham and permit a greater control of the curing process together with a further reduction in the curing period. Hams processed in accordance with the methods disclosed in these patents are commonly known as "quick cured hams."

Quick cured hams, in general, have a characteristic porky flavor which is not characteristic of hams cured by the older conventional process. Apparently certain substances are formed during the long curing process which remove or destroy the porky flavor. Since quick cured hams are subjected to the action of pickling brine for a very short period of time, for example, ten days, there is not sufficient time for these substances to develop in the brine and to destroy the porky flavor.

One of the objects of this invention is to treat pickling brine to form substances which will remove or destroy the characteristic porky flavor when the brine is used in quickly curing hams.

Another object of this invention is to provide curing pickle which will develop in quick cured hams a characteristic aged flavor.

Further objects and advantages of this invention will be apparent from the description and claims which follow.

In following the methods disclosed in the Paddock patents identified above, used cover pickling brine is generally employed as a pumping brine. Such used brine contains many bacteria, torula, and sometimes molds which elaborate a wide variety of enzymes which act on the ingredients of the brine and proteins leached from the meat and on the meat itself. In the action of the enzymes on these materials a great many by-products and intermediate products are formed. These products exist in various stages of oxidation.

I have found that the end products, that is the oxidation products of the substances formed by the action of the enzymes on the ingredients of pickling brine, are active in producing certain flavors in the cured meat and are also effective in destroying the characteristic porky flavor of quick cured hams. These end products may be formed by aerating used cover pickling brine. Aeration may be effected in several ways, for example by spraying the pickling brine in air or forcing air through the brine. Oxygen may, of course, be substituted for air.

The aerated brine when used as the pumping brine in quickly curing meat, such as ham, produces an unusual and very pleasing flavor which is entirely different from the flavor obtained by other methods of curing meat and which cannot be obtained by other methods. In the case of hams, the use of aerated brine also destroys or removes the characteristic porky flavor in quick cured hams.

The temperatures employed during aeration are not critical. It is understood, of course, that the temperatures employed should be between the freezing point and the boiling point of the brine. Although the oxygen is more soluble in the brine at lower temperatures, the speed of the reaction decreases with a decrease in temperature. The upper limits of the temperature are dependent upon the temperature at which the proteins which are present in the brine will be precipitated. I prefer to carry out the aeration at temperatures between 60 degrees F. and 140 degrees F.

Conventional pickling brines contain from 5 to 15 per cent sodium chloride, up to about 0.05 per cent sodium nitrite, up to 0.1 per cent sodium nitrate, and from 1 to 15 per cent sugar. Brine containing the desired quantities of ingredients is prepared and used as a cover pickle for a desired period of time, for example, from 15 to 65 days. At the end of this period, the brine will contain, besides the original ingredients, many bacteria, torula, and possibly molds, a wide variety of enzymes and end products of the growth of the organisms, proteins leached from the meat, and products resulting from the action of the enzymes on the ingredients of the curing pickle and the leached protein.

Used cover pickle at a temperature between 60 degrees F. and 140 degrees F. may be aerated for a period of from 24 to 48 hours by bubbling air through the pickle in sufficient quantity to satisfy the oxygen demand.

I have employed this invention in many cases. A few examples are given below:

Example I

Cover pickle used in curing ham for a period of 65 days was aerated at a temperature between 75 degrees F. and 80 degrees F. by forcing air through the brine for a period of 48 hours. The same type of cover pickle was also aerated at a temperature between 100 degrees F. and 110 degrees F. for a period of about 24 hours. In producing the aerated brine, a slight turbidity is formed due to the growth of the micro-organisms during the aeration period. Such turbidity may be removed by filtration. Both of these aerated brines were employed in quickly curing ham by injecting a quantity of the aerated brine into the circulatory system of the ham and thereafter placing the ham in a cover pickle. Ham so processed had a very pleasant odor and flavor.

Example II

A mixture of 10 per cent by volume of cover pickle used for 65 days and 90 per cent by volume of cover pickle used for 15 days was aerated at a temperature between 120 degrees F. and 125 degrees F. by bubbling air through the brine for a period of about 48 hours. The aerated product when used as a pumping brine produced ham having an improved flavor and odor, but the improvement was not as pronounced as that obtained by employing cover pickle used for 65 days and aerated as in Example I.

Example III

A mixture of 20 per cent by volume of cover pickle used 65 days and 80 per cent by volume of cover pickle used 15 days was aerated at a temperature between 70 degrees F. and 80 degrees F. by passing air through the brine for about eight hours. The temperature was then raised to about 125 degrees F. and aeration continued for about 15 hours. Aeration was then discontinued and the temperature raised to about 170 degrees F. for about one hour. The aerated brine did not become turbid. The aerated product produced hams having improved flavor and odor.

The micro-organisms which are present in used curing pickle grow very rapidly at temperatures between 70 degrees F. and 80 degrees F., but are apparently destroyed at temperatures of about 125 degrees F. The aerated product may be pasteurized by heating to a temperature of about 170 degrees F. Since curing pickles are generally filtered before being used, the development of turbidity in the pickle is not objectionable since it may be removed by the filtering operation. The use of temperatures which prevent the excessive growth of micro-organisms, however, is preferred since no filtration is required if the aerated product is not turbid. Pasteurization of the aerated pickle is desirable to destroy any possible toxic organisms.

I claim:

1. The method of improving used curing pickle which comprises aerating the pickle at a temperature between 70 degrees F. and 80 degrees F. for about eight hours, thereafter aerating the pickle at a temperature of about 125 degrees F. for about 15 hours and thereafter pasteurizing the aerated pickle.

2. The method of curing meat which comprises pumping aerated used pickling brine into the meat.

3. The method of curing meat which comprises pumping aerated used pickling brine through the circulatory system of the meat.

4. The method of curing hams which comprises pumping aerated used pickling brine into the ham and thereafter immersing the ham in a cover pickle.

5. The method of curing ham which comprises pumping aerated used pickling brine into the circulatory system of the ham and thereafter immersing the ham in a curing pickle.

6. The method of improving used curing pickle which comprises aerating the pickle at a temperature between 70° F. and 80° F. for about eight hours and thereafter aerating the pickle at a temperature of about 125° F. for about fifteen hours.

7. The method of improving used curing pickle which comprises separating the pickle from the meat and contacting the pickle with an oxygen-containing gas at temperatures of about 60 degrees to 170 degrees F. for sufficient time to develop oxidation products which produce desirable flavors in quick cured hams.

8. The method of improving curing pickle which has been used in cover curing of meat which comprises separating the pickle from the meat, aerating the pickle at temperatures below that at which proteins precipitate and sufficiently high to develop oxidation products which produce desirable flavor in quick cured hams and thereafter pasteurizing the aerated pickle.

9. The method of curing hams which comprises aerating pickle recovered from long time cover curing under conditions to produce oxidation products which impart desirable flavors and destroy the porky flavor of quick cured hams and quick curing the hams with said aerated brine.

WALTER RICHARD HESS.